Patented Feb. 2, 1954

2,668,158

UNITED STATES PATENT OFFICE 2,668,158

COATING COMPOSITIONS FOR METALS CONTAINING A PHENOL FORMALDEHYDE RESIN AND A PHOSPHATE

Robert H. Sturm, Enfield, England, assignor to Cosmocord Plastics Limited, Enfield, England, a British company No Drawing. Application November 6, 1950, Serial No. 194,383

Claims priority, application Great Britain November 7, 1949

19 Claims. (Cl. 260—25)

This invention relates to coating compositions and is primarily concerned with the production of coating compounds for adhering firmly to the surface of steel, other ferrous metals, zinc and zinc alloys, aluminum or aluminum alloys.

The invention is more particularly concerned with the production of integrally adhering coatings containing thermosetting synthetic resins.

The present invention provides a coating composition for application to steel, other ferrous metals, zinc, zinc alloys, aluminium or aluminium alloys, comprising a thermo-setting modified phenolic resin prepared initially with a basic catalyst and containing in its final stage an acid catalyst with phosphating properties.

The invention also provides the method of manufacturing a coating composition for application to surfaces of steel, other ferrous metals, zinc, aluminium or alloys thereof, comprising condensing an aldehyde with a phenol in the presence of an initially basic catalyst comprising an alkaline metal phosphate, modifying the phenolic resin during condensation, continuing condensation until the catalyst is neutral or slightly acidic, and thereafter arresting further condensation by the addition of phosphoric acid.

In carrying the invention into effect, a phenol or mixture of phenols is condensed with an aldehyde in the presence of an initially basic catalyst.

The condensation is carried out in a melt or solvent solution of a modifying agent which can be for instance natural resin, abietic acid or esters thereof with or without the addition of glycerol, ethylene glycol or penta-erythritol.

Alternatively the initial condensation product of the phenol with the aldehyde known as the A. stage condensate, that is the condensation product consisting of a large amount of phenol alcohols formed by the direct substitution of the benzene nucleus, can be dispersed in a melt or solution of the afore described modifying agents, with or without the addition of poly-hydroxyalcohols, and then further condensed, to form methylene linked chains.

At the beginning of the condensation the catalyst is basic, comprising for instance an ammonia solution and at least one basic metal-phosphate, such as sodium hexametaphosphate or tetrasodium pyrophosphate, which is convertible to an acid ortho-phosphate.

The basic catalyst accelerates the formation of the methylol phenols and further the formation of the methylene linked chains. At the same time the catalyst gradually reduces its alkalinity by conversion of the sodium metaphosphate or sodium pyrophosphate to a neutral or slightly acid ortho phosphate at the boiling temperature of the condensate and due to the water present.

Because of this conversion to a relatively weak catalyst the danger of cross linking the methylene linked chains is avoided and the condensate retains its hydrophilic properties. The reaction of this conversion brought about by hydrolising for instance sodium hexametaphosphate in an aqueous ammonium solution is as follows:

$$Na_2[Na_4(PO_3)_6] + 12NH_4OH \rightarrow$$
$$6NaH_2PO_4 + 12NH_3 + 6H_2O$$

During the condensation the free ammonia is driven off.

Furthermore the condensation at this stage is arrested by the addition of phosphoric acid alone or together with soluble metal phosphates such as sodium, zinc, manganese or cadmium phosphates in aqueous solution.

The process of modifying phenolic resins is well known to those conversant with the art. In the present invention there is prepared a stable hydrophilic modified phenolic resin with thermosetting properties which carries the catalyst in a solvent mixture. The solvent mixture is a binary or tertiary system of which water is one part.

The catalyst has a twofold function, namely to react with the metal to which the coating has been applied and to accelerate the final curing of the resinous coating to an infusable and insoluble state.

During stoving of the applied coating the catalyst which consists of phosphoric acid, metal phosphates and water reacts with the aid of the acid with the metal to which it is applied forming the corresponding metal phosphate, and deposits with the aid of the metal phosphates in solution a microcrystaline layer of complex insoluble metal phosphates on the etched and reacted metal surface. The action of the reactive catalyst is in depth by etching and converting it into the corresponding metal phosphate and in depositing an additional layer of microcrystaline metal phosphates. The passivation of the metal surface in depth and by depositing a layer of nonconductive, insoluble metal phosphates is proof against corrosion by inhibiting the formation of metal oxides and subsequently their hydroxides.

The second function of the catalyst is to accelerate with the aid of the free phosphoric acid the curing of the phenol-formaldehyde condensate by cross linking the methylene linked chains.

During the heat treatment or stoving process of the applied resinous coating the phenolic condensate becomes hydrophobic by eliminating the water contained in the coating solution plus the water formed by the progressive cross linking of the condensate. The resultant coating is a layer of non-conductive insoluble metal phosphates covered by a resinous layer. Such coatings exhibit good resistance to rust and are well keyed to the metal surface.

Examples of the preparation of coating compositions in accordance with the present invention, will now be described:

*Example 1*

Phenol is condensed with formaldehyde in the molar ratio of from 1:1.2 up to 1:2.5, in the presence of ammonia solution, together with an alkaline metal phosphate, such as sodium hexametaphosphate which act initially as a basic catalyst.

The mixture is as follows:

| | Parts by weight |
|---|---|
| Phenol | 25.0 |
| Formaldehyde solution 40% | 35.0 |
| Methyl abietate | 15.0 |
| Ammonia solution s. g. 0.933 | 6.3 |
| Sodium hexametaphosphate | 2.2 |

The mixture is charged into a mixer and kept at the boiling point for 70 to 85 minutes.

At the beginning of the condensation process the basic catalyst accelerates the formation of methylol phenols and further the formation of methylene linked chains. During the process the alkalinity of the catalyst is gradually reduced by conversion of the alkaline metal phosphate to a neutral or slightly acid ortho phosphate due to heat and the water present. This conversion avoids the danger of cross-linking of the methylene linked chains and the condensate retains its hydrophillic properties.

The mixing vessel is then connected over a cooling condenser to a receiver and by applying vacuum at a temperature of 75° C., 27 parts by weight of water are evacuated leaving 10 to 15% of water in the condensate. Next 17.5 parts by weight of acetone are added. At this stage the temperature is kept at 70° C., and further condensation is arrested by stirring a previously prepared solution of phosphoric acid and metal phosphate, to which for instance an intermediary solvent such as ethylene glycol mono ethyl ether has been added, into the condensate.

The acidifying agent may comprise:

| | Parts by weight |
|---|---|
| Distilled water | 9.65 |
| Phosphoric acid s. g. 1.750 | 10.04 |
| Manganous hydrogen phosphate | 1.51 |
| Ethylene glycol monoethyl ether | 4.80 |

To complete the condensation process to the stage where the methylol phenols combine to methylene linked chains of varying structures and sizes and to accomplish the reaction with the ester of the abietic acid due to its two conjugated double bonds, the temperature of the condensate is raised to 80° C. and kept for 30 minutes under reflux.

*Example 2*

This is an example of the alternative process in which the initial condensate is dispersed in a solution of resin with the addition of ethylene glycol.

The initial condensation is as in Example 1 using the following mixture:

| | Parts by weight |
|---|---|
| Phenol | 24.5 |
| Formaldehyde solution 40% | 32.0 |
| Ammonia solution s. g. 0.933 | 5.5 |
| Sodium hexametaphosphate | 2.0 |

Next 25 parts by weight of water are removed by vacuum distillation and then the condensate is stirred into a solution of the following composition:

| | Parts by weight |
|---|---|
| Rosin (colophony) | 12.0 |
| Ethylene glycol | 4.0 |
| Acetone | 20.0 |

The temperature is adjusted to 70° C. and 25.0 parts by weight of an acidifying agent having the composition described in Example 1 is added.

To complete the condensation process and the esterification the temperature is raised to 85° to 90° C. and kept for 45 minutes under reflux.

The modified phenolic resin solutions as prepared in Examples 1 and 2 are syrupy in nature, the yield of 100 parts of solution as formulated having a solid content of 60%.

Such resin solutions are compatible with a wide range of non-drying and drying oil modified alkyd resins, and can be loaded with inert fillers and pigments.

What I claim is:

1. A liquid coating composition for application to surfaces of steel, other ferrous metals, zinc, aluminium or alloys thereof, comprising a homogeneous mixture of a thermosetting phenol-formaldehyde resin with a modifying agent selected from the group consisting of natural resins, abietic acid and methyl abietate, together with an acidified metal phosphate and phosphoric acid, said metal phosphate being adapted to react with a metal surface to which the composition is applied to form an insoluble phosphate layer thereon and also to act with said phosphoric acid as a thermo-setting catalyst during stoving.

2. A liquid coating composition according to claim 1, in which said thermosetting resin is a stable hydrophilic colloid.

3. A liquid coating composition according to claim 1, in which the thermosetting resin is further modified by the addition of a poly-hydroxy alcohol.

4. The method of manufacturing a liquid coating composition for application to surfaces of steel, other ferrous metals, zinc, aluminum or alloys thereof, comprising condensing formaldehyde with a phenol in the presence of an initially basic catalyst comprising an alkaline metal phosphate, modifying the resin during condensation by an agent of the group consisting of natural resins, abietic acid and methyl abietate, continuing condensation until the alkalinity of said catalyst is substantially exhausted, and thereafter arresting further condensation by the addition of phosphoric acid.

5. The method according to claim 4, in which said initially basic catalyst also comprises an aqueous ammonia solution.

6. The method according to claim 4, in which said alkaline metal phosphate is sodium hexametaphosphate.

7. The method according to claim 4, in which said thermosetting resin is modified by methyl abietate.

8. The method according to claim 4, in which a metal phosphate is added with said phosphoric acid.

9. The method according to claim 4, in which said alkaline metal phosphate is tetrasodium pyrophosphate.

10. The method according to claim 4, in which a water-soluble metal phosphate is added with said phosphoric acid.

11. The method according to claim 10 in which said water-soluble metal phosphate is selected from the group consisting of sodium, zinc, manganese, and cadmium phosphates.

12. The method according to claim 19, in which there is added to said substance by which said resin is modified a further substance selected from the group consisting of glycerol, ethylene glycol and penta-erythritol.

13. The method of manufacturing a coating composition for application to surfaces of steel, other ferrous metals, zinc, aluminum and alloys thereof, comprising condensing formaldehyde with a phenol in the presence of an aqueous ammonia solution together with an initially basic catalyst comprising an alkaline metal phosphate selected from the group consisting of sodium hexametaphosphate and tetrasodium pyrophosphate, modifying the phenol formaldehyde condensate during condensation with a substance selected from the group consisting of natural resins, abietic acid and methyl abietate and when the catalyst is converted to an acid metal phosphate arresting the condensation reaction by the addition of an acidifying agent comprising phosphoric acid.

14. The method according to claim 13, in which said acidifying agent comprises a soluble metal phosphate selected from the group consisting of sodium, zinc, manganese and cadmium phosphate.

15. The method of manufacturing a coating composition for application to surfaces of steel, other ferrous metals, zinc, aluminum and alloys thereof, comprising condensing formaldehyde with a phenol in the presence of an aqueous ammonia solution, an alkaline metal phosphate and a modifying agent selected from the group consisting of natural resins, abietic acid and methyl abietate, boiling the condensation reaction mixture until the metal phosphate is substantially neutral, removing a substantial part of the water content of the reaction mixture and adding an organic solvent which is mixable with water while keeping the temperature at approximately 70° C., adding an acidifying agent comprising phosphoric acid, a metal phosphate and an intermediary solvent, to arrest the condensation reaction, and finally raising the temperature to approximately 80° C.

16. A costing composition according to claim 19, in which said acidifying agent also comprises a soluble metal phosphate selected from the group consisting of sodium, zinc, manganese and cadmium phosphate.

17. The method according to claim 13, in which the condensation reaction is arrested when the catalyst is converted to sodium orthophosphate.

18. A liquid coating composition according to claim 19 in which the modifying agent is methyl abietate.

19. A liquid coating composition for application to steel, other ferrous metals, zinc, zinc alloys, aluminum and aluminium alloys comprising a homogeneous mixture of sodium orthophosphate, phosphoric acid and compatible solvent and a thermosetting phenol-formaldehyde resin modified by an agent of the group consisting of natural resins, abietic acid and methyl abietate.

ROBERT H. STURM.

References Cited in the file of this patent

UNITED STATES PATENTS

| Number | Name | Date |
|---|---|---|
| 2,186,687 | Thompson et al. | Jan. 9, 1940 |